US010371098B2

(12) United States Patent
Roz et al.

(10) Patent No.: US 10,371,098 B2
(45) Date of Patent: Aug. 6, 2019

(54) DEVICE FOR PRESSURIZING A PROPELLANT TANK OF A ROCKET ENGINE

(71) Applicant: SNECMA, Paris (FR)

(72) Inventors: Gérard Roz, Pressagny l'orgueilleux (FR); David Hayoun, Paris (FR); Didier Vuillamy, Quincampoix (FR); François Lassoudiere, Vernon (FR)

(73) Assignee: ARIANEGROUP SAS, Paris (FR)

( * ) Notice: Subject to any disclaimer, the term of this patent is extended or adjusted under 35 U.S.C. 154(b) by 629 days.

(21) Appl. No.: 14/909,945

(22) PCT Filed: Jul. 25, 2014

(86) PCT No.: PCT/FR2014/051940
§ 371 (c)(1),
(2) Date: Feb. 3, 2016

(87) PCT Pub. No.: WO2015/018999
PCT Pub. Date: Feb. 12, 2015

(65) Prior Publication Data
US 2016/0169159 A1    Jun. 16, 2016

(30) Foreign Application Priority Data

Aug. 6, 2013 (FR) .................................... 13 57809

(51) Int. Cl.
*F02K 9/50* (2006.01)
*F02K 9/44* (2006.01)
(Continued)

(52) U.S. Cl.
CPC ................ *F02K 9/44* (2013.01); *F02K 9/425* (2013.01); *F02K 9/50* (2013.01); *F02K 9/605* (2013.01);
(Continued)

(58) Field of Classification Search
CPC ... F02K 9/425; F02K 9/44; F02K 9/46; F02K 9/50; F02K 9/605; F02K 9/62; F02K 9/64; F02K 9/972
See application file for complete search history.

(56) References Cited

U.S. PATENT DOCUMENTS 2,701,441 A * 2/1955 Mitchell .................. F02K 9/50
60/259
3,136,121 A * 6/1964 Barger ...................... F02K 9/50
60/259
(Continued)

FOREIGN PATENT DOCUMENTS

FR      2 976 626 A1    12/2012
FR      3011281 A1 *    4/2015 ............... F02K 9/50
(Continued)

OTHER PUBLICATIONS

English Translation of Search Report dated Nov. 18, 2014, in corresponding International PCT Application No. PCT/FR2014/051940, filed on Jul. 25, 2014 (2 pages).

*Primary Examiner* — William H Rodriguez
(74) *Attorney, Agent, or Firm* — Bookoff McAndrews, PLLC

(57) ABSTRACT

The device comprises a primary heater (58) suitable for heating the propellant coming from the tank (16) prior to it being reintroduced into its tank. The primary heater uses the heat of combustion from the engine (10) and the device further comprises a secondary heater (66) having its source of heat independent from the operation of the engine, the secondary heater being arranged downstream from the primary heater (58) in order to heat the propellant between its outlet from the primary heater and being reintroduced into the tank. The device also has means (62) between the feed
(Continued)

to the primary heater (58) and the return of the propellant to the tank for putting the propellant under pressure.

7 Claims, 1 Drawing Sheet

(51) Int. Cl.
   *F02K 9/42* (2006.01)
   *F02K 9/60* (2006.01)
(52) U.S. Cl.
   CPC ...... *F05D 2220/80* (2013.01); *F05D 2260/20* (2013.01)

(56) References Cited

U.S. PATENT DOCUMENTS

| | | | | |
|---|---|---|---|---|
| 3,170,295 A | * | 2/1965 | Dryden | F02K 9/44 60/259 |
| 3,188,799 A | * | 6/1965 | Flynn | F02K 7/00 376/318 |
| 5,267,437 A | * | 12/1993 | Foust | F02K 9/48 60/206 |
| 9,446,862 B2 | * | 9/2016 | Barthoulot | B64G 1/401 |
| 2009/0288390 A1 | * | 11/2009 | Pavia | F02K 9/64 60/267 |
| 2010/0300065 A1 | * | 12/2010 | Balepin | F02K 9/46 60/204 |
| 2016/0222918 A1 | * | 8/2016 | Roz | F02K 9/50 |
| 2017/0114753 A1 | * | 4/2017 | Hue | F02K 9/425 |
| 2017/0167442 A1 | * | 6/2017 | Kawaguchi | F02K 9/46 |
| 2017/0254296 A1 | * | 9/2017 | Weldon | F02K 99/00 |
| 2018/0038316 A1 | * | 2/2018 | Balepin | F02K 9/64 |

FOREIGN PATENT DOCUMENTS

| | | | |
|---|---|---|---|
| JP | 2009-274505 A | 11/2009 | |
| WO | WO 2015044563 A1 * | 4/2015 | ............... F02K 9/50 |

* cited by examiner

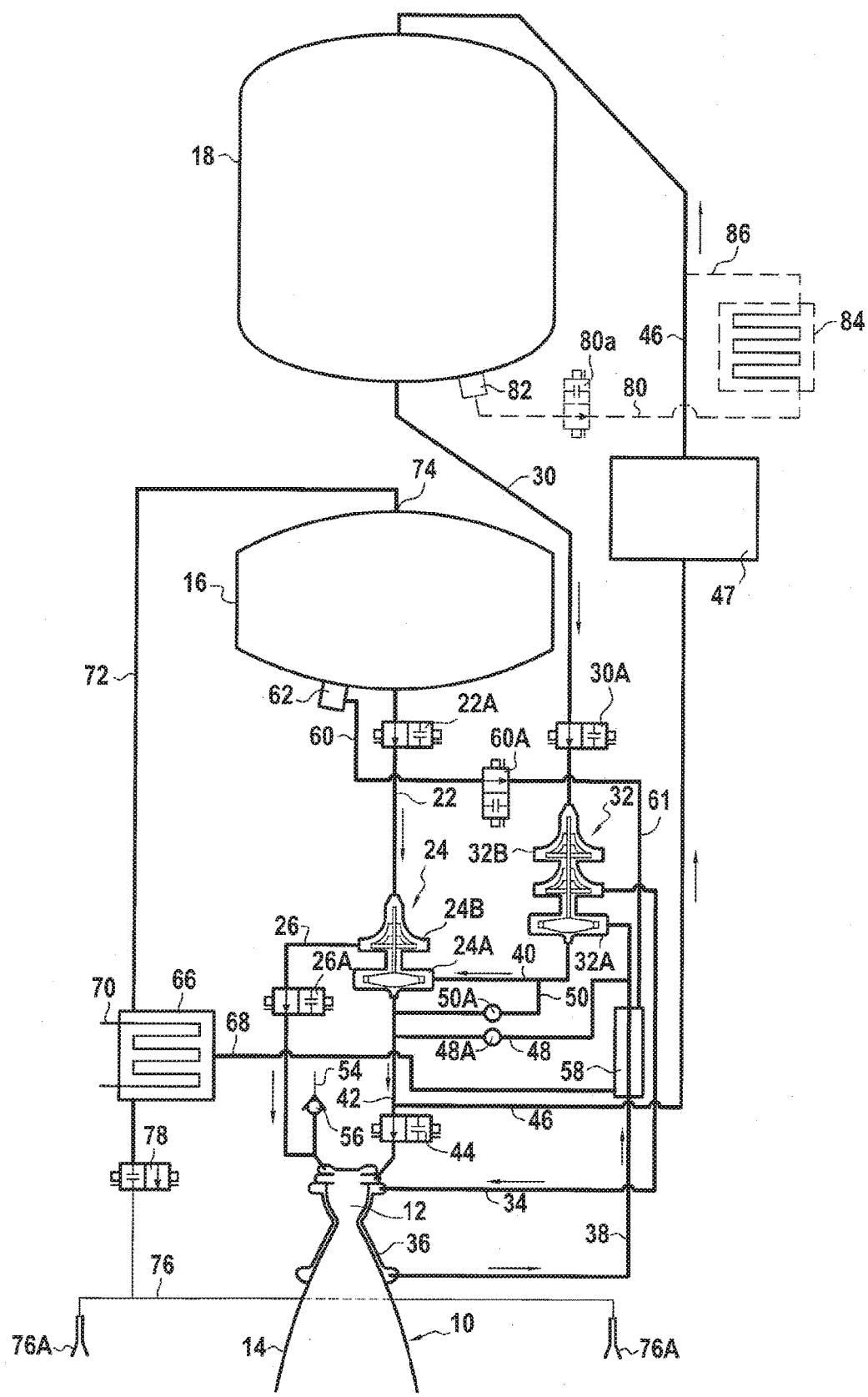

DEVICE FOR PRESSURIZING A PROPELLANT TANK OF A ROCKET ENGINE

CROSS-REFERENCE TO RELATED APPLICATIONS

This application is the U.S. national phase entry under 35 U.S.C. § 371 of International PCT Application No. PCT/FR2014/051940, filed on Jul. 25, 2014, which claims priority to French Patent Application No. FR 1357809, filed on Aug. 6, 2013, the entireties of each of which are incorporated by reference herein.

The present invention relates to a device for pressurizing a propellant tank of a rocket engine, the device comprising a pressurization loop having a primary heater suitable for heating the propellant coming from the tank prior to it being reintroduced into the tank.

The engine is usually an engine having a combustion chamber in which two propellants are mixed together in order to give rise to combustion, with the gas leaving the combustion chamber being exhausted through a nozzle so as to develop thrust.

In particular, the two propellants mixed together in the combustion chamber comprise an oxidizer, such as oxygen, and a fuel, such as hydrogen or methane.

Attention is given below to one of the propellants in particular, for example the oxidizer.

Conventionally, the propellant is stored in a tank in the liquid state, and the tank needs to be maintained under pressure in order to ensure that the flow of propellant directed to the engine is regular.

In order to ensure that the tank is pressurized, it is known to inject an inert gas into the tank, such as helium or nitrogen. It is also known to provide so-called "autogenous" pressurization whereby propellant taken from a tank is passed through a heat exchanger in order to be heated and vaporized therein prior to being reinjected in the gaseous state back into its own tank so as to form therein a blanket of gaseous propellant under pressure.

For example, the heat exchanger makes use of the heat of combustion coming from the rocket engine or from a dedicated gas generator. When the heat exchanger uses the heat of combustion from the engine, it needs to be configured in such a manner as to optimize use of that heat. In certain circumstances, that requires configurations that are relatively complex, with a multiplicity of heat exchange surfaces.

Furthermore, the heat needed for heating and vaporizing to the desired pressure can be obtained only while the engine is in an active stage of operation.

Nevertheless, a propulsion assembly for a rocket is generally designed to operate in "propulsion" stages of flight during which the engine develops thrust to propel the rocket, and "ballistic" stages during which the engine is off, so that the rocket is then subjected to the laws of ballistics only. The first portion of a flight is a propulsion stage, during which a large amount of thrust is needed to put the rocket into orbit. Thereafter, for orbital maneuvers and in order to return to earth, propulsion stages alternate with ballistic stages, and low levels of thrust applied during relatively short time periods suffice. Nevertheless, it is important that the engine can restart quickly and under good conditions at the end of a ballistic stage. This means in particular that even during a ballistic stage, while the engine is not active, sufficient pressure must be ensured in the liquid propellant tank for it to be possible to obtain the flow rate needed to restart the engine without delay.

Nevertheless, by definition, pressurization devices that make use only of the heat of combustion from the engine cannot provide pressurization during ballistic stages.

Furthermore, and as mentioned above, combustion is provided by mixing two propellants together in the combustion chamber. If those propellants need to be heated and pressurized using only the heat of combustion from the engine via heat exchangers that co-operate with the combustion chamber, then the heat exchangers operating respectively with each of the two propellants need to be structures that are complex in order to optimize the recovery of heat. Furthermore, they may enter into competition, so that it becomes difficult to obtain the desired temperature and pressure.

In order to pressurize a propellant, it is also possible to use a dedicated gas generator, which is fed with each of the two propellants in order to obtain combustion that generates the heat needed for heating and pressurization. That requires some of each of the two propellants to be taken off from their respective tanks, and the gas generator needs to be dimensioned so as to obtain the desired temperature and pressure.

An object of the present invention is to provide a device for pressurizing a propellant tank that is substantially free from the above-mentioned drawbacks. In particular, an object of the invention is to provide a device that uses elements that are simple, and of weight and cost that are moderate, making it possible to pressurize the propellant both during a propulsion stage and during a ballistic stage.

This object is achieved by the facts that the primary heater uses the heat of combustion from the engine, that the device also uses a secondary heater having its source of heat independent from the operation of the engine, the secondary heater being arranged downstream from the primary heater in order to heat the propellant between leaving the primary heater and being reintroduced into the tank, and that the device includes means in the pressurization loop for pressurizing the fluid.

The primary heater is of use during propulsion stages. It may be simple in structure, and in particular it may be of little weight, since it suffices for the primary heater to heat the propellant and to vaporize it, without any demanding temperature target. The secondary heater is arranged in series with the primary heater and thus continues with the heating so as to obtain the desired pressure. The secondary heater can itself be dimensioned so as to be simple in structure and reasonable in weight since it does no more than continue the heating and pressurization as initiated by the primary heater. The pressurizing means are arranged in the propellant pressurizing loop that runs from propellant being taken from the primary tank to its return to the tank, passing via the primary heater.

Furthermore, in a ballistic stage, only the secondary heater is active. As mentioned above, during a ballistic stage it is important to maintain pressure in the propellant tank. Nevertheless, during such a stage, the engine is inactive, so propellant is not being consumed. Thus, pressurizing consists in maintaining the level of pressurization rather than in compensating for the outflow of propellant by a substantial inflow of gas, as during a propulsion stage. Consequently, a secondary heater of structure that is simple and of weight that is moderate is capable of providing the pressurization that is needed for maintaining pressure during a ballistic stage.

In an embodiment, the secondary heater is an electric heater.

The secondary heater may thus comprise one or more coils in contact with resistors, which coils convey a flow of propellant to be heated. It may also comprise an enclosure having a resistor situated therein, so as to be immersed in the propellant. Whatever the embodiment chosen, the structure of the electric heater is particularly simple and inexpensive.

In an embodiment, the outlet from the secondary heater is suitable for being connected to an ejection pipe.

For example, this connection takes place via an isolation valve that may be closed to allow the gas leaving the heater only to return to the tank, or that may be open to inject the gas towards the ejection pipe. The ejected gas can provide thrust additional to that from the engine, should that be useful.

Advantageously, the means for pressurizing the fluid between the feed to the primary heater and the return of propellant to the tank comprise a motor-driven pump, which is advantageously arranged upstream from the primary heater.

The invention also provides a propulsion assembly including a device of the above-specified type pressurizing a first tank containing a first propellant, a rocket engine fed by said first propellant and by a second propellant coming from a second tank, and a regenerator circuit for said second propellant, this circuit including a regenerative heat exchanger that co-operates with the engine to heat the second propellant prior to being reintroduced into the second tank, wherein the primary heater co-operates with an outlet pipe from the regenerative heat exchanger.

Thus, the primary heater takes advantage of the regenerative circuit, which is used primarily for heating the second propellant, in order to pre-heat and vaporize the first propellant, this pre-heating and vaporization being finished off by the additional increase in temperature achieved by the secondary heater.

If it is necessary to pressurize the second tank during a ballistic stage, it is possible to provide an auxiliary circuit for pressurizing the second propellant without using the heat of combustion from the engine. By way of example, provision may be made for a small dedicated gas generator, or for a heater that is analogous to the above-mentioned secondary heater, that co-operates with second propellant being taken off from its own tank.

In an embodiment, the primary heater comprises at least one tube immersed in the outlet pipe.

This particularly simple structure enables the heat necessary for pre-heating and first pressurization to be recovered.

The invention can be well understood and its advantages appear better on reading the following detailed description of an embodiment given by way of non-limiting example. The description refers to the accompanying FIGURE, which shows a propulsion assembly using a pressurizer device of the invention.

FIG. 1 (hereinafter referred to as "the FIGURE") is a schematic illustration of a propulsion assembly.

The propulsion assembly shown in the FIGURE comprises a rocket engine 10 having a combustion chamber 12 and a nozzle 14 having a diverging portion. The combustion chamber is fed with propellant from a first tank 16 containing a first propellant, in particular an oxidizer propellant such as oxygen, and from a second tank 18 containing a second propellant, in particular a reducing propellant such as hydrogen or methane. The reducing propellant acts as fuel, while the oxidizer propellant acts as oxidizer for combustion.

The feed of propellant from the first tank 16 comprises a first main feed pipe 22 delivering into a first turbopump 24 and a first injection pipe 26 connected to the outlet from the first turbopump 24. The first injection pipe 26 delivers into the combustion chamber via an isolation valve 26A. An authorization valve 22A is also arranged in the pipe 22.

The feed of second propellant comprises a second main pipe 30 having an authorization valve 30A arranged therein and delivering into a second turbopump 22, and a second injection pipe 34 that is connected to the outlet from the second turbopump.

Specifically, the engine 10 is of the expander type, i.e. it is an engine in which the second propellant is taken and vaporized in order to provide energy for certain portions of the propulsion assembly. More precisely, the injection pipe 34 delivers into a heater 36 that co-operates with the wall of the second combustion chamber 12 to act during a propulsion stage to heat the second propellant flowing through the heater so as to vaporize it. At the outlet from the heater 36, the second propellant is taken to a pipe 38 in the turbine portion 32A of the turbopump 32 in order to drive its turbine so as to actuate its pump portion 32B, which is a two-stage portion in this example. At the outlet from the turbine portion 32A, the second propellant is taken by a feeder pipe 40 to the inlet of the turbine portion 24A of the first turbopump 24 so as to actuate the pump portion 24B of the first turbopump. At the outlet from the turbine portion 24A, the second propellant is taken to the inlet of the combustion chamber by an injection pipe 42. An isolation valve 44 is arranged in the injection pipe 42, which pipe is connected to the second tank 18 via a pressurizer and expansion valve system 47. The vaporized second propellant thus returns to the tank 18 in order to form a gas blanket of pressure that can be adjusted by the system 47.

Thus, the propulsion assembly has a regenerative heat exchange circuit that uses the heat of combustion from the engine 10 to vaporize the second propellant. This regenerative heat exchange circuit comprises the heater 36 and the pipes 38, 40, 42, and 46.

A bypass pipe 48 with a bypass valve 48A is arranged between the pipes 38 and 42 in order to bypass the inlets of the turbines. Another bypass pipe 50 with a bypass valve 50A is arranged between the outlet of the turbine portion of the turbopump 32 and the injection pipe 42 in order to bypass the turbine portion 24A of the turbopump 24. These bypass pipes and valves serve to direct the flow of propellants to the combustion chamber, taking a portion of the flow passing through the turbines 24A and 32A so as to vary the pressure rise and the flow rate supplied by the pumps 24B and 32B.

The first propellant is injected directly by the injection pipe 26, which is fed by the turbopump 24.

The device for pressurizing the first propellant comprises a primary heater 58 that uses the heat of combustion from the engine 10. Specifically, this primary heater 58 co-operates with the outlet pipe 38 from the heater 36, which extends between the heater 36 and the inlet to the turbine portion 32A of the turbopump 32. The primary heater is fed with the first propellant by a feed pipe 60 connected to the first tank 16 via a motor-driven pump 62 or the like. An authorization valve 60A is arranged in this feed pipe 60. Instead of being connected directly to the tank 16 as in the example shown, the motor-driven pump 62 could be connected as a branch from the segment of pipe 22 that extends between the tank and the valve 22A.

The outlet from the primary heater 58 is connected to a secondary heater 66 via a connection pipe 68. In other words, the secondary heater 66 is connected in series with the primary heater 58. Specifically, the secondary heater comprises an enclosure in which there flows the first propellant coming from the pipe 68, and in which there is arranged an electrical resistance 70 that is powered by an electrical power supply (not shown). Thus, in the primary heater, the first propellant is subjected to pre-heating that serves to vaporize it, with this pre-heating being finished off by additional heating in the secondary heater.

The outlet from the secondary heater 66 is connected to the tank 16 by a return 74 via a return pipe 72 so that the vaporized first propellant forms a gas blanket in the first tank 16.

For example, the primary heater raises the first propellant to a temperature of about 110K so as to vaporize it, at a pressure of about 5 bars as generated by the turbopump 62. The secondary heater serves to obtain a temperature of about 180K to 210K, making it possible to obtain the pressure required in the gas blanket 16. At its end remote from the tank 16, it can be seen that the return pipe 72 co-operates with an ejection pipe 76 via an isolation valve 78. The valve 78 may be opened so that gaseous oxygen escaping via the ejection nozzles 76A of the exhaust pipe 76 contributes to thrust from the engine, whenever that is appropriate, e.g. during a ballistic stage, when very low levels of thrust are needed, in particular immediately before restarting the engine.

In the example shown, the motor-driven pump 62 is arranged upstream from the primary heater, which is an advantageous configuration, making it possible to obtain the desired pressure for the gas propellant blanket in the top portion of tank 16 using a motor-driven pump of small capacity and power. Nevertheless, it is also possible to use a motor-driven pump for pressurizing the propellant in some other zone of the loop, between the feed to the primary heater 58 and the return 74 to the tank.

As mentioned above, the regenerator circuit serves to heat the second propellant during a propulsion stage of the engine, and also to pre-heat the primary propellant by the primary heater 58, this pre-heating being finished off by the heating performed by the secondary heater 66. In a ballistic stage, only the heater 66 is active and it serves to raise the first propellant to the desired temperature for maintaining the pressure in the tank 16.

In order to pressurize the tank 18 in a ballistic stage, the propulsion assembly may include an auxiliary circuit that does not use the heat of combustion from the engine 10. An example of such an auxiliary circuit is drawn in dashed lines and it operates by taking the second propellant from the tank 18, heating the second propellant, and reinjecting the gaseous second propellant into the blanket of the tank 18. In the example shown, this circuit comprises a feed pipe 80 fed by a motor-driven pump 82 or the like for delivering the desired pressure and flow rate, and having an isolation valve 80A arranged therein. This pipe also has a heater 84, e.g. of the same type as the above-described secondary heater 66. At the outlet from this heater, the hot and vaporized propellant is returned to the tank via the return pipe 46 to which the outlet pipe 86 from the heater 84 is connected.

The invention claimed is:

1. A pressurization device for pressurizing a propellant tank of a rocket engine, the device comprising a pressurization loop having a primary heater suitable for heating the propellant coming from the tank prior to it being reintroduced into the tank, the primary heater using the heat of combustion from the engine, the device further including a secondary heater having its source of heat independent from the operation of the engine, the secondary heater being arranged downstream from the primary heater to heat the propellant between the propellant leaving the primary heater and being reintroduced into the tank, the propellant being put under pressure in the pressurization loop.

2. A device as claimed in claim 1, wherein the secondary heater is an electric heater.

3. A device as claimed in claim 1, wherein the outlet from the secondary heater is suitable for being connected to an ejection pipe.

4. A device as claimed in claim 1, including a motor-driven pump arranged upstream from the primary heater.

5. A propulsion assembly including a device as claimed in claim 1 for pressurizing a first tank containing a first propellant, a rocket engine fed by said first propellant and by a second propellant coming from a second tank, and a regenerator circuit for said second propellant, this circuit including a regenerative heat exchanger that co-operates with the engine to heat the second propellant prior to being reintroduced into the second tank, the primary heater co-operating with an outlet pipe of the regenerative heat exchanger.

6. An assembly as claimed in claim 5, wherein the primary heater comprises at least one tube immersed in the outlet pipe.

7. An assembly as claimed in claim 5, including an auxiliary circuit for pressurizing the second tank without using the heat of combustion from the engine.

\* \* \* \* \*